(12) United States Patent
Garrett

(10) Patent No.: US 6,755,027 B2
(45) Date of Patent: Jun. 29, 2004

(54) CYLINDRICAL SPRING WITH INTEGRAL DYNAMIC GAS SEAL

(75) Inventor: Steven L. Garrett, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 10/409,760

(22) Filed: Apr. 9, 2003

(65) Prior Publication Data

US 2003/0192322 A1 Oct. 16, 2003

Related U.S. Application Data

(60) Provisional application No. 60/445,866, filed on Feb. 6, 2003, provisional application No. 60/372,008, filed on Apr. 10, 2002, and provisional application No. 60/371,967, filed on Apr. 10, 2002.

(51) Int. Cl.[7] .............................. F25B 9/00; F16F 13/00; F16M 1/00; F16M 11/00; F16M 5/00
(52) U.S. Cl. .............................. 62/6; 267/81; 267/140.4
(58) Field of Search ........................ 62/6; 267/81, 140.4, 267/162, 141.1

(56) References Cited

U.S. PATENT DOCUMENTS

| | | | |
|---|---|---|---|
| 2,549,464 A | | 4/1951 | Hartley |
| 2,551,505 A | * | 5/1951 | Olson ........................... 267/28 |
| 2,605,099 A | * | 7/1952 | Brown ......................... 267/33 |
| 2,836,033 A | | 5/1958 | Marrison |
| 4,036,018 A | | 7/1977 | Beale |
| 4,043,546 A | * | 8/1977 | Ashfield et al. ............ 267/162 |
| 4,114,380 A | | 9/1978 | Ceperley |
| 4,355,517 A | | 10/1982 | Ceperley |
| 4,398,398 A | | 8/1983 | Wheatley et al. |
| 4,489,553 A | | 12/1984 | Wheatley et al. |
| 4,490,983 A | | 1/1985 | Gifford et al. |
| 4,599,551 A | | 7/1986 | Wheatley et al. |
| 4,625,517 A | | 12/1986 | Miller |

(List continued on next page.)

FOREIGN PATENT DOCUMENTS

| | | | | |
|---|---|---|---|---|
| EP | 0 614 059 A1 | 3/1994 | ............. | F25B/9/14 |
| EP | 0 678 715 A1 | 4/1994 | ............. | F25B/9/14 |
| GB | 2 237 866 A | 10/1990 | ............. | F25B/9/00 |
| WO | WO 02/087279 A2 | 10/2002 | | |

OTHER PUBLICATIONS

Garrett, Steven, "ThermoAcoustic Life Sciences Refrigerator", Oct. 30, 1991, pp. 4–43.
Ceperley, Peter H., "A pistonless Stirling engine—The traveling wave heat engine", J.Acoust. Soc. Am, 66(5), Nov. 1979, pp. 1508–1513.
Gedeon, David, "DC Gas Flows in Stirling and Pulse Tube Cryocoolers", Cryocoolers 9, Edited by R.G. Ross, Jr., Plenum Press, NY, 1997, pp. 385–392.

(List continued on next page.)

*Primary Examiner*—William C. Doerrler
(74) *Attorney, Agent, or Firm*—Gifford, Krass, Groh, Sprinkle, Anderson & Citkowski, PC

(57) ABSTRACT

One embodiment of a spring with an integral dynamic gas seal according to the present invention includes a spring with a pair of spaced-apart ends and a spring body extending therebetween. The spring body includes a perimeter wall formed of a first material and extending in a longitudinal direction. The wall has a plurality of openings defined therein. The openings are provided in a plurality of transverse tiers. Each tier includes a plurality of separate openings each extending along a portion of the perimeter. The openings in each tier are spaced apart so as to define a post between each adjacent opening such that each tier includes a plurality of posts. The openings in each tier are staggered with respect to the openings in adjacent tiers such that each of the openings in each tier overlie one of the posts in an adjacent tier. A closure member closes each of the openings such that the spring body is sealed. The closure member is formed of a second material having a different degree of flexibility than the first material.

13 Claims, 5 Drawing Sheets

U.S. PATENT DOCUMENTS

| | | | |
|---|---|---|---|
| 4,686,407 | A | 8/1987 | Ceperley |
| 4,722,201 | A | 2/1988 | Hofler et al. |
| 4,858,441 | A | 8/1989 | Wheatley et al. |
| 4,858,717 | A | 8/1989 | Trinh et al. |
| 4,953,366 | A | 9/1990 | Swift et al. |
| 5,165,243 | A | 11/1992 | Bennett |
| 5,174,130 | A | 12/1992 | Lucas |
| 5,269,147 | A | 12/1993 | Ishizaki et al. |
| 5,295,355 | A | 3/1994 | Zhou et al. |
| 5,303,555 | A | 4/1994 | Chrysler et al. |
| 5,319,938 | A | 6/1994 | Lucas |
| 5,339,640 | A | 8/1994 | Reinke |
| 5,357,757 | A | 10/1994 | Lucas |
| 5,389,844 | A | 2/1995 | Yarr et al. |
| 5,456,082 | A | 10/1995 | Keolian et al. |
| 5,502,968 | A | 4/1996 | Beale |
| 5,515,684 | A | 5/1996 | Lucas et al. |
| 5,519,999 | A | 5/1996 | Harpole et al. |
| 5,579,399 | A | 11/1996 | Lucas |
| 5,647,216 | A | 7/1997 | Garrett |
| 5,673,561 | A | 10/1997 | Moss |
| 5,701,743 | A | 12/1997 | Hagiwara et al. |
| 5,813,234 | A * | 9/1998 | Wighard .......................... 62/6 |
| 5,857,340 | A | 1/1999 | Garrett |
| 5,901,556 | A | 5/1999 | Hofler |
| 5,953,920 | A | 9/1999 | Swift et al. |
| 5,953,921 | A | 9/1999 | Garrett |
| 5,996,345 | A | 12/1999 | Hofler |
| 6,032,464 | A | 3/2000 | Swift et al. |
| 6,059,020 | A | 5/2000 | Jairazbhoy et al. |
| 6,079,214 | A | 6/2000 | Bishop |
| 6,145,320 | A | 11/2000 | Kim |
| 6,233,946 | B1 | 5/2001 | Masuda |
| 6,307,287 | B1 | 10/2001 | Garrett et al. |
| 6,314,740 | B1 | 11/2001 | De Bloc et al. |
| 6,385,972 | B1 | 5/2002 | Fellows |
| 6,490,881 | B1 | 12/2002 | Sinclair et al. |
| 2001/0025494 | A1 | 10/2001 | Okamura et al. |
| 2002/0166325 | A1 | 11/2002 | Corey |
| 2002/0178736 | A1 | 12/2002 | Corey et al. |

OTHER PUBLICATIONS

Wakeland, Ray Scott, "Use of electrodynamic drivers in thermoacoustic refrigerators", J. Acoust. Soc. Am. 107(2), Feb. 2000, pp. 827–832.

Swift, G.W., Ward, W.C., "Simple Harmonic Analysis of Regenerators", Journal of Thermophysics and Heat Transfer, vol. 10, No. 4, Oct.–Dec. 1996, pp. 652–662.

Garrett, S., Perkins, D., Gopinath, A., "ThermoAcoustic Refrigerator Heat Exchangers: Design, Analysis and Fabrication", Physics Dept.—Code PH/Gx, Naval Postgraduate School, Monterey, CA, pp. 375–379.

Swift, G., Migliori, A., Wheatley, J., "Liquid Metal Thermoacoustic Engine", Condensed Matter and Thermal Physics Group, Los Alamos National Laboratory, Los Alamos, NM.

Swift, G., "Analysis and performance of a large thermoacoustic engine", J. Acoust. Soc. Am 92(3), Sep. 1992, pp. 1551–1563.

Swift, G., "Thermoacoustic Engines and Refrigerators", Physics Today, Jul. 1995, pp. 22–28.

Swift, G., "Thermoacoustic engines", Journal of Accoustical Society of America 84(4), Jul. 1988, pp. 1145–1180.

Garrett, S., Adeff, J., Hofler, T., "Thermoacoustic Refrigerator for Space Applications", Journal of Thermophysics and Heat Transfer, vol. 7, No. 4, Oct.–Dec. 1993, pp. 595–599.

Backhaus, S., Swift, G., "A thermoacoustic Stirling heat engine", Nature, vol. 399, May 27, 1999, www.nature.com, pp. 335–338.

Garrett, S., "Reinventing the engine", Nature, vol. 399, May 27, 1999, www.nature.com, pp. 303–305.

Backhaus, S., Swift, G., "New Varieties of Thermoacoustic Engines", Condensed Matter and Thermal Physics Group, Los Alamos National Laboratory, Los Alamos, NM, Jul. 2002, pp. 1–8.

Backhaus, S., Swift, G., "A thermoacoustic–Stirling heat engine: Detailed study", J. Acoust. Soc. Am. 107(6), Jun. 2000, pp. 3148–3166.

Backhaus, S., Swift, G., "Fabrication and Use of Parallel Plate Regenerators in Thermoacoustic Engines", Proceedings of IECEC'01, 36th Intersociety Energy Conversion Engineering Conference, Jul. 29–Aug. 2, 2001, Savannah, GA, pp. 1–5.

Wakeland, R., Garrett, S., "Lessons From a Thermoacoustic Refrigeration Demonstration Device", The Pennsylvania State University Applied Research Laboratory, Technical Report No.: TR 98–005, Dec. 1998, pp. 1–117.

Swift, G., Gardner, D., Backhaus, S., "Acoustic recovery of lost power in pulse tube refrigerators", J. Acoust. Soc. Am. 105(2), Pt. 1, Feb. 1999, pp. 711–724.

Gardner, D., Swift, G., "Use of inertance in orifice pulse tube refrigerators", Cryogenics 37 (1997), 1997 Elsevier Science Limited, pp. 117–121.

* cited by examiner

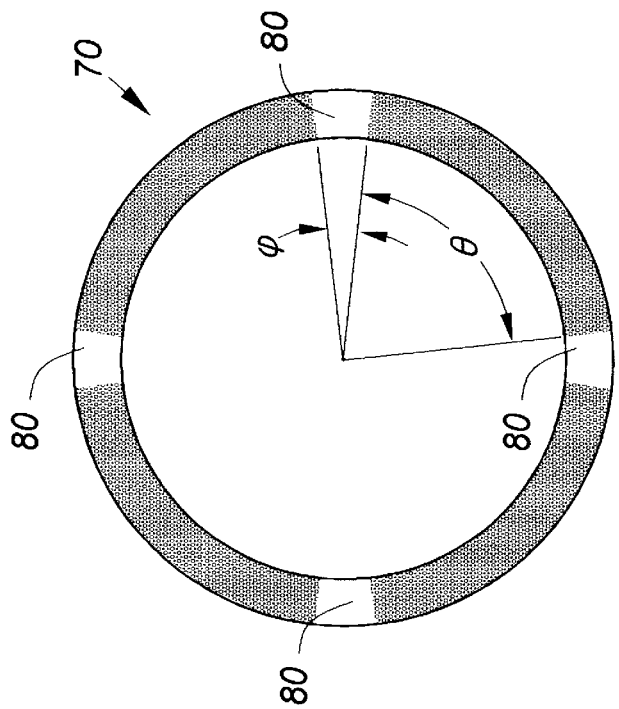
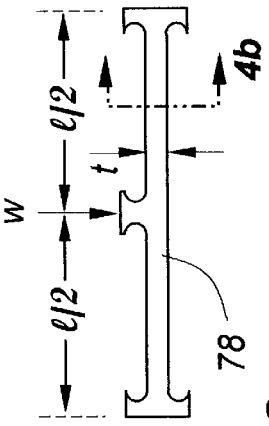
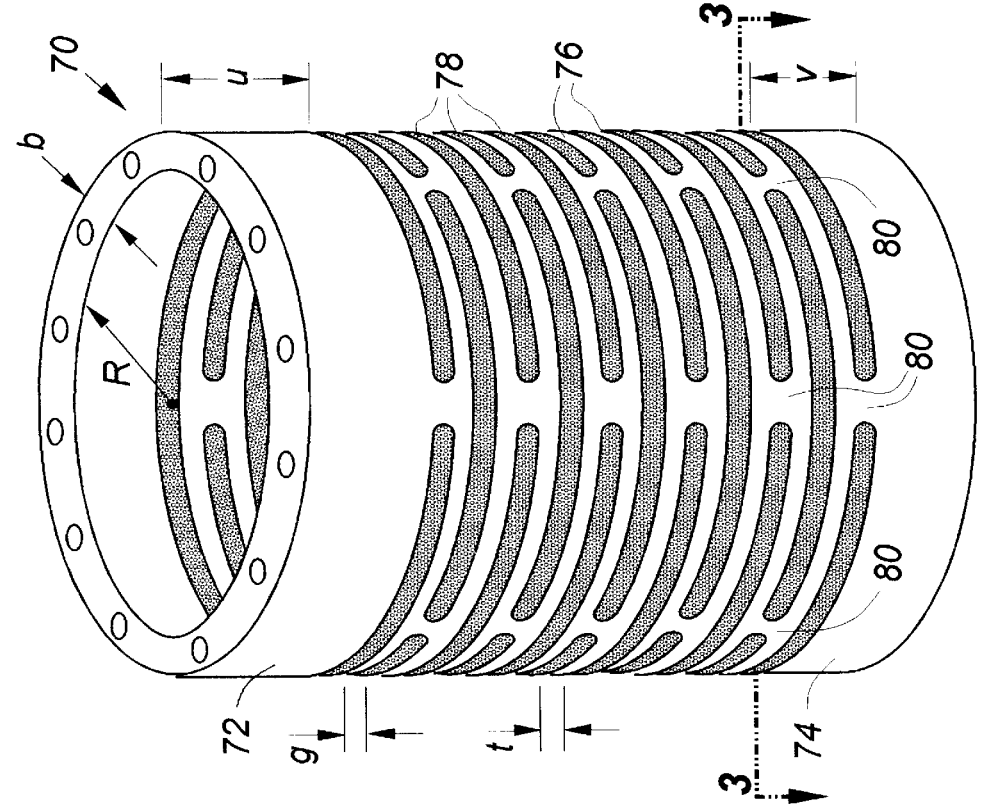
*Fig - 3*
*Fig - 4a*
*Fig - 2*

CYLINDRICAL SPRING WITH INTEGRAL DYNAMIC GAS SEAL

REFERENCE TO RELATED APPLICATIONS

This patent application claims benefit from U.S. provisional patent application Serial Nos. 60/372,008, filed Apr. 10, 2002; 60/371,967, filed Apr. 10, 2002; and 60/445,866, filed Feb. 6, 2003, the entire contents of all of which are incorporated herein by reference.

FIELD OF THE INVENTION

The present invention relates generally to springs and flexure seals and, more specifically, to a spring design that may include an integral dynamic gas seal.

BACKGROUND OF THE INVENTION

The present invention falls generally into the fields of springs and seals. However, one of the preferred applications of the present invention is in a thermoacoustic engine or refrigerator. One such thermoacoustic device is shown in FIG. 1. This thermoacoustic device 20 is the subject of U.S. provisional patent application Serial No. 60/372,008, filed Apr. 10, 2002, and a co-pending patent application entitled "Compliant Enclosure for Thermoacoustic Devices," filed Apr. 9, 2003, the entire contents of both of which are incorporated herein by reference. Another thermoacoustic device is shown in U.S. provisional patent application Serial No. 60/371,967, filed Apr. 10, 2002, and a co-pending patent application entitled "Thermoacoustic Device," filed Apr. 9, 2003, the entire contents of both of which are incorporated herein by reference.

The thermoacoustic refrigerator 20 includes an outer pressure vessel 50 containing substantially all of the components of the refrigerator, including a compliant enclosure. The compliant enclosure, in turn, houses the thermal components or thermal core 40. These thermal components 40 include a cold heat exchanger 14, a regenerator 16, and a hot heat exchanger 18. These components 40 are supported by a thermally insulating plate 22 that accommodates the passage of heat exchanged fluids through tubes 24, which communicate with thermal sinks or loads outside the pressure vessel 50. A piston 26 is spaced below the thermal components 14–18, with a bellows 28 extending between and interconnecting the piston 26 and the thermally insulated plate 22. A linear motor or actuator 30 is interconnected with the piston 26 by a moving portion 32 of the motor 30. Therefore, the motor 30 is operable to move the piston. In the illustrated embodiment, the moving portion 32 of the motor 30 is interconnected with the piston 26 by a rigid tube 36. A cylindrical spring 34 may be provided between the piston 26 and some stationary portion of the device, such as the insulating plate 22, to adjust the mechanical resonance frequency of the system.

Most of the thermoacoustic engines and refrigerators that that have been constructed and tested to date, and that either use or produce electricity, operate at "acoustic" frequencies, usually in the range from about 40 Hz to 500 Hz. To operate at these frequencies, the electro-mechanical transduction device (e.g., loudspeaker or linear motor/alternator) requires some supplemental stiffness, such as spring 34, to allow the moving mass of the electro-mechanical device to resonate at the desired operating frequency. Operation at the resonance frequency has been shown to produce optimally efficient electro-mechanical energy conversion [R. S. Wakeland, *J. Acoust. Soc. Am.* 107(2), 827–832 (2000)].

In some devices, the gas trapped behind the piston, which produces the sound wave in a thermoacoustic refrigerator, provides this supplemental stiffness. The linear harmonic motion of the piston may also be driven by gas pressure oscillations produced by a thermoacoustic engine. The piston is then used to produce electricity when joined to a linear alternator. One such embodiment of a linear alternator is described in U.S. Pat. No. 5,389,844. In other devices, a mechanical spring, usually made of steel, is used to prove the required supplemental stiffness, as taught in U.S. Pat. No. 5,647,216 (linear) and U.S. Pat. No. 5,953,921 (torsional).

Some mechanism must be provided to prevent the passage of gas around the piston that couples the mechanical energy of the electromechanical device to or from the acoustical energy of the thermoacoustic device. Traditionally, either a clearance or flexure seal has been employed. Thermoacoustic device 20 in FIG. 1 makes use of a flexure seal, which takes the form a bellows 28.

A clearance seal is produced by a very narrow gap between the circumference of the piston and the cylindrical bore within which the piston must slide. The clearance seal requires very close tolerance (hence expensive) machining of both the piston and the bore. This clearance seal arrangement is known to produce extraneous energy dissipation when some amount of the gas passes through the gap (know as "blow by" loss). The clearance seal can also produce dissipation due to fluid friction produced by fluid (gas) shear caused by the relative motion of the piston and the bore. In addition to the excess dissipation, an asymmetry between the compression and expansion tends to move gas preferentially behind or in front of the piston. This dynamically-induced static pressure difference tends to un-center the piston (known as "piston walking"). Some additional mechanism must be provided to relieve the accumulating differential pressure, such as a relief valve, or an acoustic bypass.

For electrically-driven thermoacoustic refrigerators, the flexure seal employed most successfully to date has been the metal bellows. The metal bellows has advantages over the clearance seal since it does not permit blow-by and the energy dissipated by mechanical losses produced by the metal's flexure is negligibly small. The bellows seal is limited by the fact that the bellows material must be quite thin, typically less than one one-hundredth of an inch (250 micrometers) thick, if it is to be capable of an infinite number of excursions that are on the order of ±10% of its convolved length [for further details, see *Standards of the Expansion Joint Manufacturer's Association, Inc.*, 25 North Broadway, Tarrytown, N.Y. 10591]. Since the walls of the bellows must be thin (to reduce deflection stresses), the bellows does not provide the significant elastic stiffness necessary to resonant the moving mass of the electro-mechanical transducer, nor is it always capable of sustaining the large pressure differentials (that produce pressure stresses in the bellows) that would allow it to produce the stiffness required for it to function as a gas spring.

SUMMARY OF THE INVENTION

One purpose of the present invention is to provide a cylindrical spring design that may be more compatible with a new "bellows bounce" resonant cavity than the flat spring designs taught in U.S. Pat. No. 6,307,287. Such a "bellows bounce" resonance cavity is well-suited for compact thermoacoustic engines and refrigerators that utilize electro-mechanical transducers such as moving-magnet motor/ alternators. The geometry and function of a "bellows bounce" resonant cavity is described in U.S. provisional patent application Serial No. 60/372,008, filed Apr. 10, 2002, and a co-pending patent application entitled "Compliant Enclosure for Thermoacoustic Devices," filed Apr. 9, 2003.

A cylindrical spring design according to the present invention can also act as a dynamic gas seal if the gaps between the elastic "spring beams" are closed with a second compliant material, such as an elastomer (e.g., rubber or silicone adhesive), to prevent the passage of the gas that is being compressed and expanded by the motion of the spring. By sealing the gaps with a low-loss compliant material [e.g., Type I rubber as described by J. C. Snowdon, *Vibration and Shock in Damped Mechanical Systems* (J. Wiley & Sons, 1968). Chapter 1], the spring can also replace the bellows that has traditionally been used to provide the flexure seal necessary for vibroacoustic compression and expansion the working fluid (e.g., air, inert gas, or mixture of inert gases) in previous thermoacoustic refrigerators as taught in U.S. Pat. No. 5,647,216.

If the low-loss compliant material used for the dynamic gas seal described above is replaced with a high-loss compliant material (e.g., Type II rubber), then a spring according to the present invention is suitable for use as a vibration isolation mount to decouple machinery vibration from transmission though the structure by which the machine is supported.

One embodiment of a spring with an integral dynamic gas seal according to the present invention includes a spring with a pair of spaced-apart ends and a spring body extending therebetween. The spring body includes a perimeter wall formed of a first material and extending in a longitudinal direction. The wall has a plurality of openings defined therein. The openings are provided in a plurality of transverse tiers. Each tier includes a plurality of separate openings each extending along a portion of the perimeter. The openings in each tier are spaced apart so as to define a post between each adjacent opening such that each tier includes a plurality of posts. The openings in each tier are staggered with respect to the openings in adjacent tiers such that each of the openings in each tier overlie one of the posts in an adjacent tier. A closure member closes each of the openings such that the spring body is sealed. The closure member is formed of a second material having a different degree of flexibility than the first material.

A thermoacoustic device according to the present invention includes a housing and a thermal core disposed in the housing. A thermal core includes at least a first and a second heat exchanger. A piston is spaced from the thermal core, with the piston being operable to oscillate with respect to the thermal core. The thermoacoustic device also includes a spring with an integral dynamic gas seal, as discussed above.

BRIEF DESCRIPTION OF THE DRAWINGS

FIG. 2 is a perspective view of first embodiment of a spring according to the present invention;

FIG. 3 is a cross-sectional view of the spring of FIG. 2 taken along lines 3—3;

FIG. 4a is a detailed view of a portion of one beam element, which forms part of a cylindrical spring according to the present invention;

DETAILED DESCRIPTION OF THE INVENTION

Figure 4B:
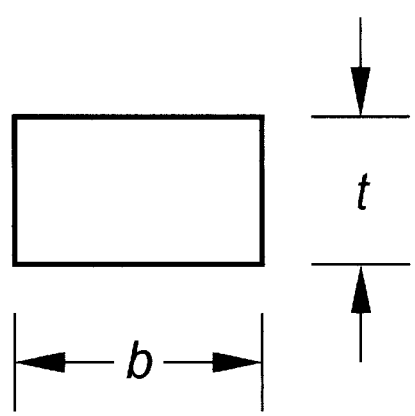
FIG. 4b is a cross-sectional view of the beam element of FIG. 4a taken along lines 4b—4b.

The description and operation of the present invention is based on two figures that serve to illustrate the geometry of the spring (FIGS. 2 and 3) and additional figures that allow for the simplified calculation of the spring's stiffness (FIGS. 4a and 4b). A design example will be presented to demonstrate how considerations of the desired spring compression and expansion (excursion), available spring material properties (Young's modulus and endurance limit), the stiffness of an individual "beam," and the dimensions of the spring interact to constrain the parameter space available for exploitation of the desirable features of this invention.

FIG. 2 provides a perspective view of a cylindrical spring according to the present invention that can be thought of as having been machined from a uniform tube of material. The inner radius of the tube is R and the tube's wall thickness is b. The upper (moving) portion 72 of the spring 70 is called the upper collar (which has a length u). This upper collar 72 may be used for joining the top of the spring 70 to the moving piston and electro-mechanical transducer of a thermoacoustic device. The upper collar is shown with twelve threaded holes to accept threaded fasteners, though other attachment means may be used. The lower (fixed) portion of the spring 70 (which as a length v) is called the lower collar 74. The lower collar 74 serves the same mounting function at the spring's bottom, and is considered to be immobile. The threaded mounting holes in the lower collar 74 are not visible in this Figure. Since the position of the lower collar 74 is fixed, v can be as long as necessary for purposes of attachment or for passage of transport fluids or electrical cables through the spring 70. The length of the upper collar, u, is preferably as short as possible, since the upper collar moves with the piston. Lowering of the total moving mass, $m_o$, which includes the mass of the upper collar, reduces the total stiffness requirement, $k_{tot}$, to resonate the electro-mechanical transduction system at a given frequency, $f_o = \omega_o/2\pi$.

$$f_o = \frac{\omega_o}{2\pi} = \frac{1}{2\pi}\sqrt{\frac{k_{tot}}{m_o}} \quad (1)$$

The length of the spring (excluding the upper and lower mounting collars) is composed from the sum of the thickness of the m beams 76, each with a thickness t, and the (m+1) gaps 78 of height g. The total length of the spring, comprised by the spring portion plus the upper and lower collars is $L_{tot}$=u+v+mt+(m+1)g. The gaps 78 are illustrated at FIG. 2 as being filled with a sealing material, which is an optional feature of the present invention, and will be discussed in more detail hereinbelow.

FIG. 3 shows a section through the lowest gap of the spring 70. There are four posts 80, (n=4), extending between the lowest beam 76 and the lower collar 74. The beams 80 are positioned with radial symmetry, such that they are approximately 90 degrees apart. With reference to FIG. 3, the posts may be said to be arranged at the twelve o'clock, three o'clock, six o'clock, and nine o'clock positions. Four posts 80 also extend between the lowest and second lowest beams. However, these posts 80 are positioned at radial positions halfway between the posts extending between the lowest beam and the lower collar. Therefore, they are positioned at approximately 45 degrees from the posts below them. They are again arranged with radial symmetry, such that they are separated by approximately 90 degrees. The beams, which in FIG. 2 total ten (m=10), continue to be staggered such that the posts are aligned in every other gap, as shown. As shown, the ends of the gaps are radiused where they form the posts 80, so as to reduce the stress concentrations at the ends of the gaps. The radius at the ends of these gaps is half of the gap height, r=g/2.

The posts 80 which join adjacent beams 76 have an angular width of $\phi$ as measured from the center of their semi-circular cuts. The gaps have an angular width $\theta$, measured between the centers of the cut radius. The design assumes that there are an integer number n of posts or gaps in the radial direction, so that $n(\theta+\phi)=360°$.

While FIGS. 2 and 3, in the above discussion, assume the provision of ten beams 76 and four posts 80 extending between each beam, a spring according to the present invention may be provided with other numbers of beams and/or posts. Preferably, the posts 80 are provided in staggered positions such that each post is radially intermediate the posts immediately above and/or below it.

The spring 70 may be described as having a pair of ends 72 and 74 with a spring body, composed of the beams 76 and posts 80, extending therebetween. The spring body is defined by a perimeter wall, with thickness b, formed of a material such as steel. The perimeter wall extends in a direction, which may be referred to as a longitudinal direction. The wall has a plurality of openings 78 which are provided in a plurality of tiers. For example, in FIG. 2 there are 11 tiers of four openings each. Each tier may be described as including a plurality of separate openings 78 that each extend along a portion of the perimeter wall. The openings in each tier are spaced apart so as to define the posts 80 such that each tier includes a plurality of posts, such as four in FIGS. 2 and 3. As shown, the openings in each tier are staggered with respect to the openings in adjacent tiers such that each of the openings in each tier overlie one of the posts in an adjacent tier.

FIGS. 4a and 4b provide a simplified diagram of a single beam that is drawn as a straight bar of thickness t and width b. The curvature of the beam along the cylinder is neglected to simplify the calculated behavior. A more accurate analysis would include the torsional deformation that might be created by the curvature of the beam. The length of the beam is taken to be l=R$\theta$, and it is loaded through the post of effective length R$\phi$, with a force W, resulting in a maximum deflection at the center of the beam, directly below the point where the force is applied, by an amount $y_{max}$.

Single Beam Analysis

The analysis of the spring and the consequences of the analysis for the implementation of a spring design for a specific application will be made by analyzing the quasi-static elastic behavior of a single beam. The stiffness of the single beam is taken to be k. There are n beams in azimuth so their stiffness is additive. There are m beams along the axial direction of the spring. The stiffness of the n beams in a single layer is nk, where k is the stiffness of a single beam. The m layers of beams are in series, so the total stiffness $k_{tot}$ of the n times m beams that comprise the spring is therefore, $$k_{tot} = n\frac{k}{m} \tag{2}$$

The analysis of the single beam requires only three results from the well-known behavior of thin elastic beams, where the "thinness" condition requires that l>>t and l>>b. For the following analysis, it is assumed that the ends of the beam are clamped so that at the displacement at the ends of the beam is zero and that the slope of the beam at the ends is also zero. The plausibility of those boundary conditions is based on the symmetry of the deflection induced by the symmetric loading of all adjacent beams.

The stresses in the beam deformed by the normal force applied at its center are linear in the distance of the stress point from the neutral axis of the beam. The neutral axis is located within the center of the beam equidistant from the upper and lower surfaces of the beam. The maximum stresses therefore occur at the surface of the beams, a distance t/2 above and t/2 below the neutral (central) axis. Using the appropriate expressions from the extensive literature on elasticity [see, for example, W. C. Young, *Roark's Formulas for Stress & Strain*, 6$^{th}$ ed. (M$^c$Graw-Hill, 1989)], the maximum stress $\sigma$ at the top and bottom surfaces of the beam is related to the load force W by the following expression:

$$\sigma = \frac{3}{4}\frac{l}{b}\frac{W}{t^2} \tag{3}$$

When loaded with force W, the center of the beam deflects an amount $y_{max}$.

$$y_{max} = \frac{-W}{16Eb}\left(\frac{l}{t}\right)^3 \tag{4}$$

The resulting effective stiffness of the beam, $k=-W/y_{max}$, is given by re-arrangement of Equation 4.

$$k = \frac{-W}{y_{max}} = 16Eb\left(\frac{t}{l}\right)^3 \tag{5}$$

Equations 3–5, are sufficient to determine the design of the spring if the required stiffness k, load W, and spring excursion $\Delta L = my_{max}$, are known, along with the Young's modulus E and the maximum allowable fatigue stress $\sigma_{fat}$ of the spring material. To illustrate the procedure, a simplified design is presented below.

Design Example

To simplify the design process, it will be assumed that the beam thickness is equal to the gap thickness, t=g. This choice is neither necessary nor optimal. The gap need only be large enough so that when the spring is fully compressed, the beams do not touch. If an elastomer is placed in the gap, as taught later in this disclosure, then the requirements of the elasomer's performance (e.g., dynamic gas sealing, elastomer stiffness, or damping control) will also be a factor in the specification of the gap's geometry. If again it is assumed that the spring must be able to compress or expand by ten percent (10%) of it's active length, $L_{ac} \cong m(g+t)$, if $m>>1$. Since the thickness of the beam will not change, the gap must decrease by 20% of its height g. If t=g, this requires that $y_{max}=0.20$ t if the spring is to be compressed or expanded to 10% of its active length $L_{ac}$.

$$\frac{y_{max}}{t} = 0.20 = \frac{1}{5} = \frac{W}{16Eb}\frac{l^3}{t^4} \quad (6)$$

Using Equation 3, the thickness of the beam can be expressed as, $$t^2 = \frac{3}{4}\frac{W}{\sigma_{fat}}\frac{l}{b} \quad (7)$$

W is the force (load) applied at the center of the beam that creates a maximum stress at the upper or lower surface of the beam. To produce a spring which will survive an infinite number of compressions and expansions of the required magnitude, the maximum stress is set equal to the maximum safe full-reversing dynamic fatigue limit, $\sigma_{fat}$, also known as the stress endurance limit, if the material is steel.

Substitution of Equation 7 into Equation 6 leads to a unique specification of the length-to-thickness ratio for the beam that will survive the specified load and displace an amount equal to 0.20 t without ever experiencing fatigue failure.

$$\frac{l}{t} = \sqrt{\frac{12E}{5\sigma_{fat}}} \quad (8)$$

Substitution of the length-to-thickness ratio into Equation 5 specifies the stiffness of the beam, if the width of the beam b is known and b<<l.

$$k = 16Eb\left(\frac{12E}{\sigma_{fat}}\right)^{3/2} \cong 665b\frac{E^{5/2}}{\sigma_{fat}^{3/2}} \quad (9)$$

It is instructive to substitute some numbers into the design for a realistic application in a small ($\leq 200$ watt) thermoacoustic application. If a steel spring is assumed, the Young's modulus is $E=30\times10^6$ psi (200 GPa). The fatigue stress for excellent spring steels (e.g., 17-7 PH), with proper heat treatment and excellent surface treatment (e.g., shot peened and polished), the ratio of the full-reversing, endurance limit (infinite lifetime) stress to the Young's modulus is $\sigma_{fat}/E \geq 0.003$. For this example, a more conservative value of $\sigma_{fat}/E \cong 0.001$ will be assumed. Using Equation 8 results in a length-to-thickness ratio of about 50, if $\sigma_{fat}/E=1\times10^{-3}$. If the inner diameter of the cylinder, 2R=5"=12.7 cm, and three beams in azimuth (n=3) are selected, the beam length is about 12 cm and the beam thickness will be about 2.5 mm (0.10").

Using Equation 5, and assuming a beam width (tube wall thickness) of 1.27 cm (½"), the stiffness of a single beam will be $k=3.2\times10^5$ N/m=1,830 lbs/in. Since each "layer" of the spring contains three beams (n=3) in this example, the "layer" stiffness is $3k=9.6\times10^5$ N/m=5,500 lbs/in. If a stiffness of 500 lbs/in is required to supplement the gas stiffness produced by the spring incorporating the dynamic gas seal described in the subsequent section, then there need to be eleven (m=11) layers.

If the inner diameter of the spring 2R=12.7 cm=5", then the length of a single beam will be l=12.0 cm. The beam thickness (equal to the gap height, based on the initial assumption) t=g=2.4 mm. The active length of the spring (excluding the collar lengths, u+v) is therefore $L_{ac}$=mt+(m+1)g=5.52 cm. The allowable spring expansion or compression would be 5.5 mm corresponding to a total stroke of 11 mm. Since $2\pi R/n$=13.3 cm, the pedestal's angular width $\phi$=1.3/13.3=0.098 radians=5.6°. The angular width of the beam is $\theta$=120°−5.6°=114.4°.

In this model, the product of the stroke $2\Delta L=2my_{max}$ and the total spring stiffness $k_{tot}$=nk/m is fixed by the geometry of the single-beam design (R, l, t, g, m and n) and the material properties of the spring material (E and $\sigma_{fat}$). These two properties ($2\Delta L$ and $k_{tot}$) can be traded-off against each other within the constraints of the quasi-static, single-beam model, as long as the finite-frequency effects related to the speed of flexural waves along a beam $c_{flex}$ and the speed of compressional waves along the spring $c_{comp}$ do not invalidate the model as discussed below.

The assumptions which allowed the application of quasi-static elastic beam theory require that the time-harmonic displacements of the beam are driven at a frequency f which is much lower than the lowest (fundamental) standing wave resonance frequency of the beam $f_1>>f$. If the beam is considered to be driven by the post and terminated by a clamped end condition a distance $l' \leq \frac{1}{2}$ from the post, the standard expression [see W. C. Young, *Roark's Formulas for Stress & Strain*, $6^{th}$ ed. (M$^c$Graw-Hill, 1989); Table 36, pg. 714] for the lowest resonance frequency of a beam subjected to clamped conditions (zero displacement and zero slope) is $$f_1 = \frac{22.4}{\pi\sqrt{48}}\frac{t}{(l/2)^2}\sqrt{\frac{E}{\rho}} \cong \frac{c_{bar}t}{(l/2)^2} \quad (10)$$

The density of the spring material is $\rho$ and $c_{bar}=(E/\rho)^{1/2}$ is the speed of longitudinal waves in the spring material. For the previous example, in steel, $c_{bar}$=5,050 m/sec and ½=6 cm, resulting in $f_1$=3.5 kHz, a frequency significantly higher than the assumed operating frequency of the small (200 W) thermoacoustic chiller (f<200 Hz).

The stiffness $k_{tot}$ and inertia (mass) m of the material that is used to produce a conventional bellows [see *Standards of the Expansion Joint Manufacturer's Association, Inc.*, 25 North Broadway, Tarrytown, N.Y. 10591] leads to a compressional wave speed $c_{comp}$ that was derived in terms of those two parameters by R. W. M. Smith [see *High Efficiency Two Kilowatt Acoustic Source for a Thermoacoustic Refrigerator*, Penn State Applied Research Laboratory Technical Report No. TR 01-001 (November, 2000), pages 43–45]

$$c_{comp} = L_{ac}\sqrt{\frac{k_{tot}}{m}} = \sqrt{\frac{L_{ac}k_{tot}}{2\pi R\Phi\rho b}} \quad (11)$$

The mass of the spring is based on the density of the spring material $\rho$ and the volume fraction $\Phi$ of the material used in the spring design, $\Phi \geq t/(t+g)$. For the design example, $L_{ac}$=5.52 cm, $\rho$=7,700 Kg/m$^3$, and the volume fraction of steel is approximately $\Phi \cong 0.55$, if t=g and the posts are included. This leads to a compressional wave speed of $c_{comp}$=15 m/sec.

Smith has shown that the optimal operating frequency corresponds to a quarter-wavelength fitting within the active length of the spring, $L_{ac}=\lambda/4=c_{comp}/4f_{opt}$. This optimal operating frequency provides a high operating frequency that results in a dynamic stress increase of $\pi/2$ greater than the stress for quasi-static deflection of the same compression (or expansion) amplitude. For a spring of fixed length and given amplitude of compression (or expansion), the stress in the spring is uniform along the axial direction if the frequency of deflection (compression and expansion) is much less than $f_{opt}$. This low frequency stress is called the quasi-static limit. If the deflection frequency is much greater than $f_{opt}$, then compressional waves will travel along the spring in the axial direction and be reflected at its ends. These compressional waves will produce very high stress concentrations at various locations along the spring while reducing the overall effective stiffness of the spring, since different portions of the spring will be in compression and extension at the same instant. If the spring is deflected at a frequency that is twice $f_{opt}$, or integer multiples of $f_{opt}$, then there will be half-wavelength compressional standing wave resonances on the spring. These resonances will greatly enhance the stresses at the compressional wave displacement nodes and at both end of the spring, but will produce no net compression or expansion. Operation at any one of these compressional wave resonance frequencies can induce fatigue failure, since the resonances are very weakly damped.

The condition corresponding to an optimal operating frequency for the example is $f_{opt}=c_{comp}/4L_{ac}=68$ Hz. At that optimal frequency, the quasi-static excursion design limit ($\Delta L=0.10 L_{ac}$) must be de-rated by a factor of $2/\pi=0.64$.

According to an alternative preferred embodiment of the present invention, the gaps 78 are each filled with an elastomeric material. If an elastomeric material seals the gaps between the beams, then the spring can also function as a dynamic gas seal replacing the bellows in a typical thermoacoustic device. The extent to which the elastomeric seal can successfully resist the pressure differential $\Delta p$ across spring/bellows combination while providing a long-life dynamic gas seal depends on the adhesive (shear) strength of the joint between the elastomer and spring material. The product of the differential pressure and the frontal area of one of the sides of the elastomeric plug that resists the differential pressure gives the force F that the pressure differential exerts on the elastomeric plug. This force can be approximated as $F=lg\Delta p$. This force imposes as shear stress $\sigma_{shear}=F/lb$ on the bond between the beam and the elastomeric seal. This corresponds to a stress attenuation factor of b/g; the shear stress on the elastomer-beam joint is reduced from the pressure differential $\Delta p$ by a factor of b/g. In the sample design the stress reduction factor b/g=1.27/0.24=5.2.

For the typical small thermoacoustic refrigeration application ($\leq 200$ W), the static pressure might be 10 atm$\cong$150 psi and pressure differential would be about 2 atm $\cong$30 psi. The shear stress on the joint would be reduced by 5.2, corresponding to a shear stress $\sigma_{shear}<7$ psi. This stress if far below the allowed shear stress for most elastomeric adhesive joints to metallic substrates.

Elastomeric Stiffness

The elastic modulus of elastomers is complex in the sense that the modulus has both elastic and dissipative components. The values of these moduli are dependent on the material and any fillers (e.g., carbon black) that are frequently combined with the material. For low-loss (Type I) rubbers, the dissipative component of the elastomer's complex elastic modulus is typically less than 10% of the elastic component. For high-loss (Type II) rubbers, the dissipative component of the modulus can be 50% or more of the elastic component.

The stiffness contribution made by the elastomer to the elastic stiffness of the beams is determined by the shear modulus G of the elastomer and by the geometry of the gap width b and height g. The effective modulus of the elastomer $E_{eff}$ will be limited from below by the elastomer's Young's modulus E=3G (since the Poisson's ratio for elastomers is $v\cong 0.50$) and from above by the elastomer's bulk modulus B. Following H. T. Loeser [*Principles of Sonar Installation*, Naval Underwater Systems Center Technical Document No. 6059 (26 Jan. 1982), pg. 3–32], the effective modulus can be approximated by, $$E_{eff}=3[1+\beta S^2]G \qquad (12)$$

The "shape factor" S is the ratio of the loaded area on one face of the elastomer to the area of the unloaded faces. $\beta \cong 2$ for most elastomers that are not considered "hard."

For the geometry used in the previous example, the area of one loaded face is lb. The area of the two unloaded faces is 2lg. This makes $S^2=(b/2g)^2 \cong (12.7 \text{ mm}/4.8 \text{ mm})^2 =7$, for the example case. The net effect is that the effective modulus of the rubber is about 45 G. The rubber can add significant stiffness to the spring and therefore allow the length-to-thickness ratio of the beams to be reduced significantly, thereby increasing the allowed excursion without reducing the overall spring stiffness.

Unlike the metal portion of the spring, the elastomer can dissipate a substantial fraction of its stored elastic energy. The ratio of the dissipated to stored energy is given by the damping factor $\delta$. For an elastomer, the stiffness and the dissipation will be both temperature and frequency dependent. Type I rubbers exhibit rather small changes in stiffness and damping over a small ($\pm 20°$ C.) range of temperatures around room temperature. Typically, for Type I rubbers near room temperature and for frequencies $\leq 100$ Hz, $\delta \leq 0.1$. For Type II rubbers the temperature and frequency dependence of both k and $\delta$ can be significant and the dissipation will be $0.5\pm 0.2$.

For the bellows/spring in a thermoacoustic refrigeration application, a very low dissipation, Type I rubber would be appropriate to minimize mechanical losses that degrade overall system efficiency. For a vibration isolator, higher damping Type II rubber might provide dissipation to control the isolator's performance at frequencies close to the isolator's natural frequency.

Absence of Spring Tilt and Twist

The most common spring design is the helical wire coil spring. Its ubiquity is due to the simplicity and energy efficiency of the coil spring design. For the thermoacoustic applications that are of primary concern in the design of the cylindrical spring that is the subject of this invention, a coil spring has several disadvantages. A simple helical wire coil spring has a starting and stopping point that does not provide a flat surface to interface to the fixed and moving ends of the load and can introduce a tilting force when compressed or expanded from its unloaded length. Further disadvantages include the fact that a uniform axial compression or expansion of a helical wire coil spring will cause the spring to twist. This twist introduces torques to the electromechanical transducer that can degrade, damage or destroy the transducer.

The spring design disclosed herein produces neither tilt nor twist during expansion or compression.

Cylindrical Spring Geometry

One advantage of the spring design of FIG. 2 is that it is well-suited to a compact thermoacoustic device design that is shaped like a cylinder with a length-to-diameter (aspect) ratio that is close to unity. Since the spring has a cylindrical tube-shape, it can fully utilize the available space surrounding the thermal components (heat exchangers and stack or regenerator). This permits the distribution of the elastic energy stored in the spring over the greatest amount of spring material. The cylindrical spring can be used to replace or to supplement the stiffness supplied by the flat spring designs taught by U.S. Pat. No. 6,307,287.

Combination with Elastomer for Dynamic Gas Seal

When the spaces between the beams in this design are filled with an elastomer, the spring can also act as a flexure seal. Under appropriate conditions, in thermoacoustic applications, this means that the design disclosed herein can perform both the functions usually satisfied by a separate spring and bellows. Flexibility in the choice of beam and gap thickness opens a parameter space the has the potential to provide larger excursions (hence larger compression ratios) than would be possible with existing spring or bellows designs.

Constrained Layer Damping for Vibration Isolation

The use of the cylindrical spring and elastomer gap filler allows the design of a vibration isolation component that can provide both stiffness and damping. Choice of spring geometry and elastomeric gap filler provides the vibration isolation designer with the opportunity to approach the optimal combination of stiffness and damping. In addition, the metal beams provide a convenient and reliable path for removal of the thermal energy created by the dissipation that takes place in the elastomer that would typically have a lower thermal conduction capability. Since the stiffness and damping of high-loss elastomeric materials is typically a strong function of temperature, this ability to conduct heat away from the elastomer will improve the stability of the isolator's stiffness and damping.

Alternatives

The availability of different spring and elastomeric materials, and the number of independent geometrical design parameters (R, b, n, m, l, t, g, u, and v), provide sufficient flexibility for all of the applications in areas of stiffness augmentation, dynamic gas sealing, and vibration isolation.

As will be clear to those of skill in the art, a number of different elastomeric materials may be used to seal the gaps in the cylindrical spring 70. Examples of a type 1 material are natural rubber, neoprene, and SBR rubber (75/25 butadiene-styrene copolymer), while examples of a type 2 material are plasticized polyvinyl butyral resin, Thiokol RD™, and plasticized polyvinyl acetate. Also, while the spring 70 has been described as being constructed from steel, it may also be made from other materials, such as plastics or composites.

The spring 70 is illustrated as being cylindrical. However, it may alternatively have other cross sectional shapes, such as square, octagonal, or ellipsoidal. Additionally, while the wall thickness, b, is illustrated as being constant, it may alternatively vary along the length or around the perimeter. The wall thickness, as well as the several other geometrical parameters (b, l, t and g) and material parameters for both the spring material and the gap-filling material, may vary in accordance with the teachings of U.S. provisional patent application Serial No. 60/445,866, filed Feb. 6, 2003.

Figure 5A:
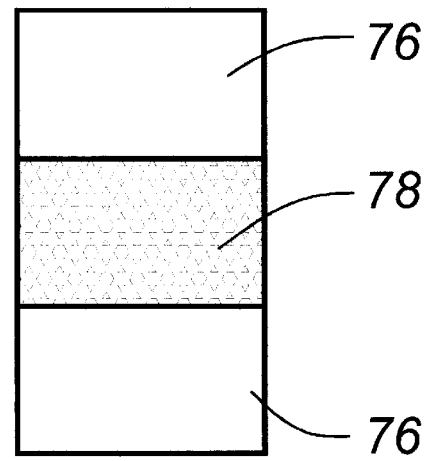
FIG. 5a is a portion of a spring with an integral gas seal according to the present invention, showing a pair of beams with a compliant material disposed in the opening therebetween.
Figure 5B:
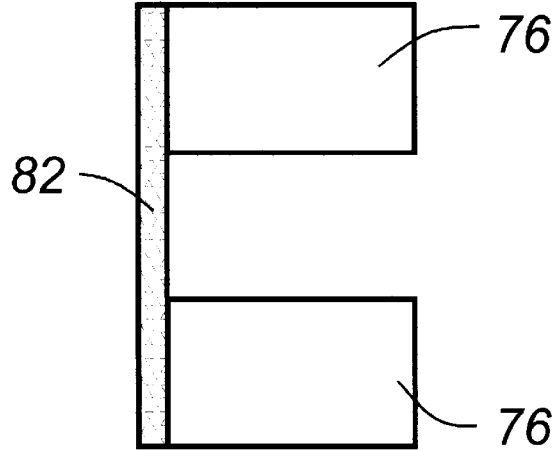
FIG. 5b is a cross-sectional view of a portion of an alternative embodiment of a spring with integral seal according to the present invention, showing a pair of beam elements, with a closure member attached to one side so as to seal the opening between the beams.
Figure 5C:
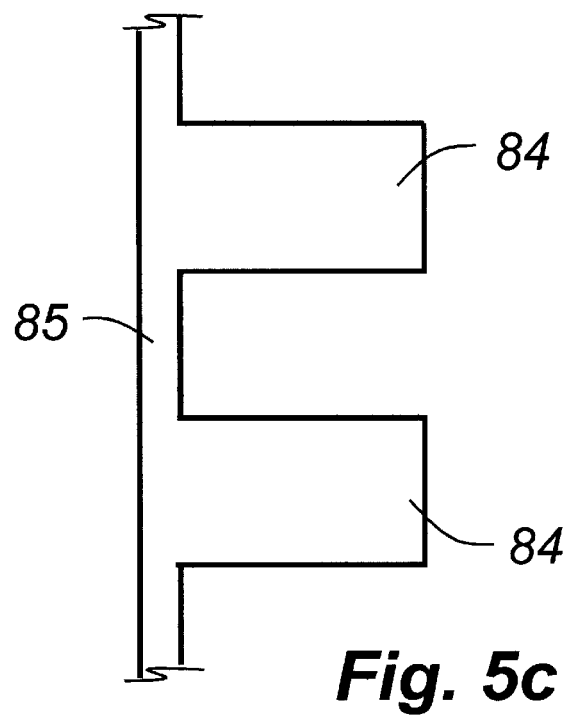
FIG. 5c is a cross-section of yet another alternative embodiment of a spring according to the present invention, wherein the openings between adjacent beams are not cut all the way through, thereby providing an integrated sealing element.

FIG. 5a illustrates a cross-section of a pair of beams 76 with a gap 78 filled with an elastomeric material. This is the configuration shown in FIG. 2. FIG. 5b illustrates an alternative wherein the gap between two beams 76 is closed by a closure member 82, which may be an elastomeric material provided as a sleeve inside the spring body. In the case of FIGS. 5a and 5b, the elastomeric material may be referred to as a closure member that closes each of the openings, whether the elastomeric material is provided in the gap or as a backing to the gap. As a further alternative, the closure member 82 may be provided on the outside of the perimeter wall, and/or may be combined with elastic material filling the gaps. The closures member 82 may be a continuous sleeve, or may be individual pieces that close the individual openings. FIG. 5c illustrates yet another embodiment wherein a pair of beams 84 are interconnected by a thin wall 85. In this embodiment, the openings have not been cut entirely through the perimeter wall, leaving the thin wall 85. If the spring is formed of a material with sufficient flexibility, the thin wall 85 may be used to seal the gaps while still allowing some flexibility.

Thermoacoustic Devices Utilizing the Cylindrical Spring

Figure 1:
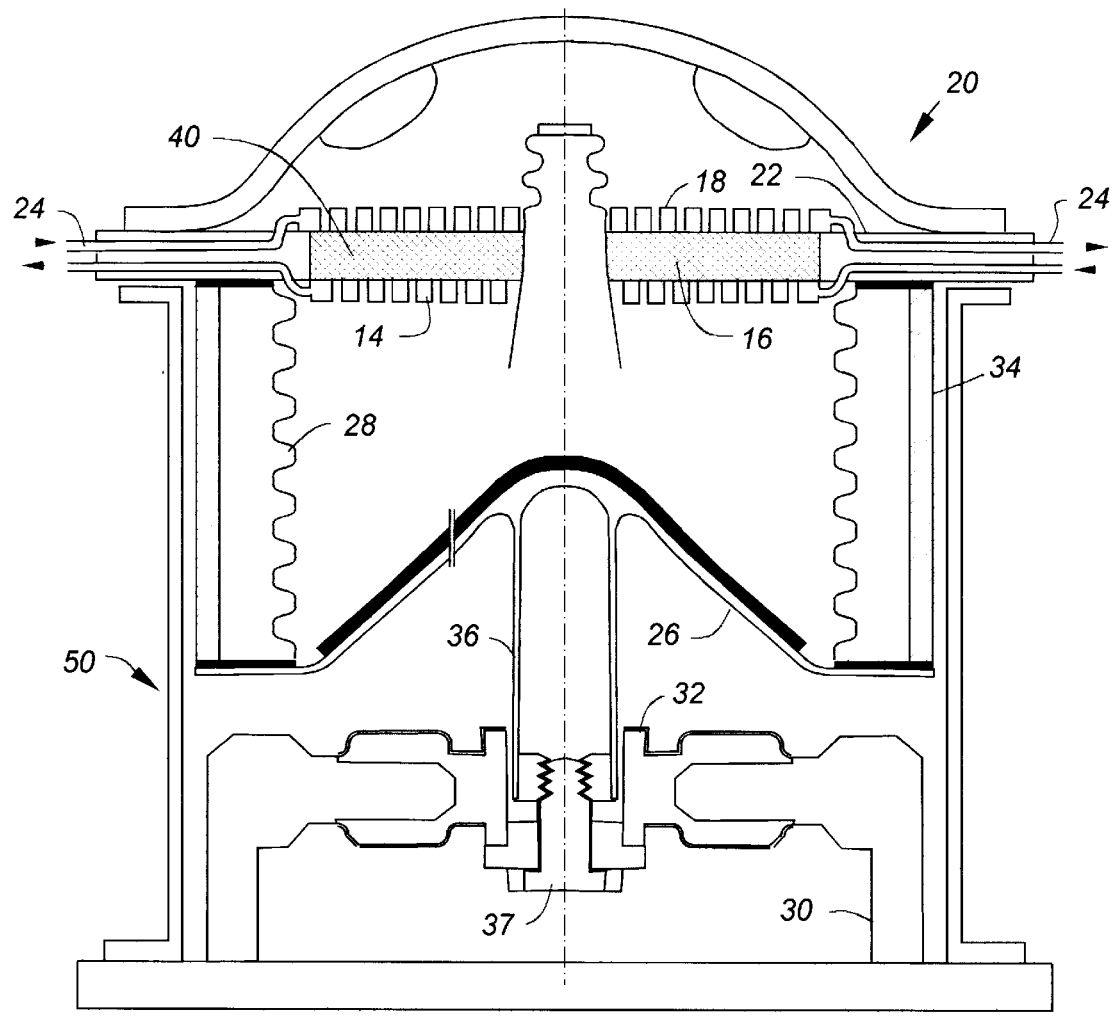
FIG. 1 is a cross-sectional view of a thermoacoustic device.
Figure 6:
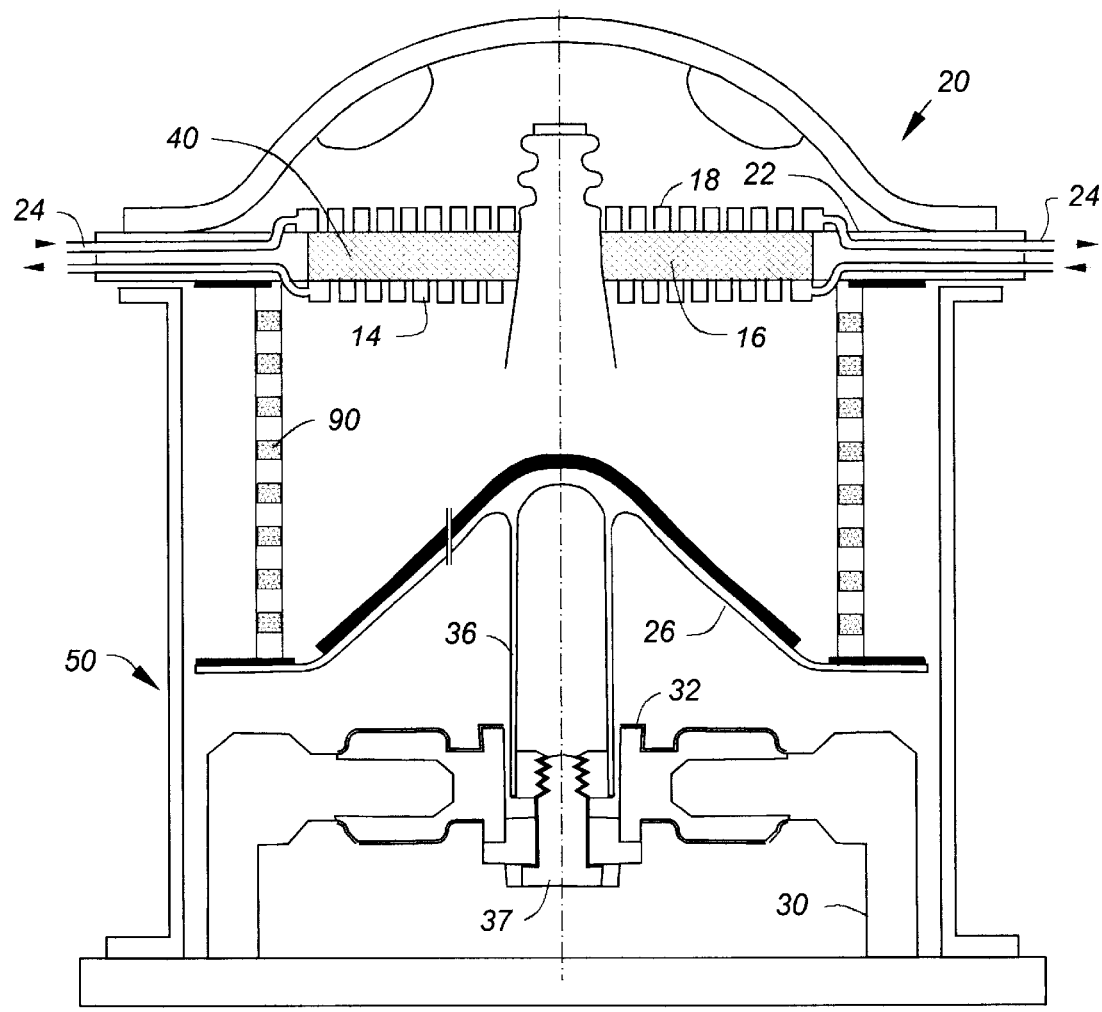
FIG. 6 is a cross-sectional view of a thermoacoustic device similar to FIG. 1, utilizing a spring with an integral dynamic gas seal according to the present invention.

FIG. 6 illustrates a thermoacoustic device of FIG. 1, modified so as to replace the spring and bellows with a spring with integral dynamic gas seal, according to the present invention. The spring with integral dynamic gas seal is shown at 90 and extends between the piston 26 and the support 22, and serves both as a spring element and to seal gasses in the bellows volume 38. Alternatively, the spring 90 may be provided without the integral seal, wherein the openings are left open. Then, an additional sealing element, such as a flexure seal may be provided to provide the sealing function.

Figure 7:
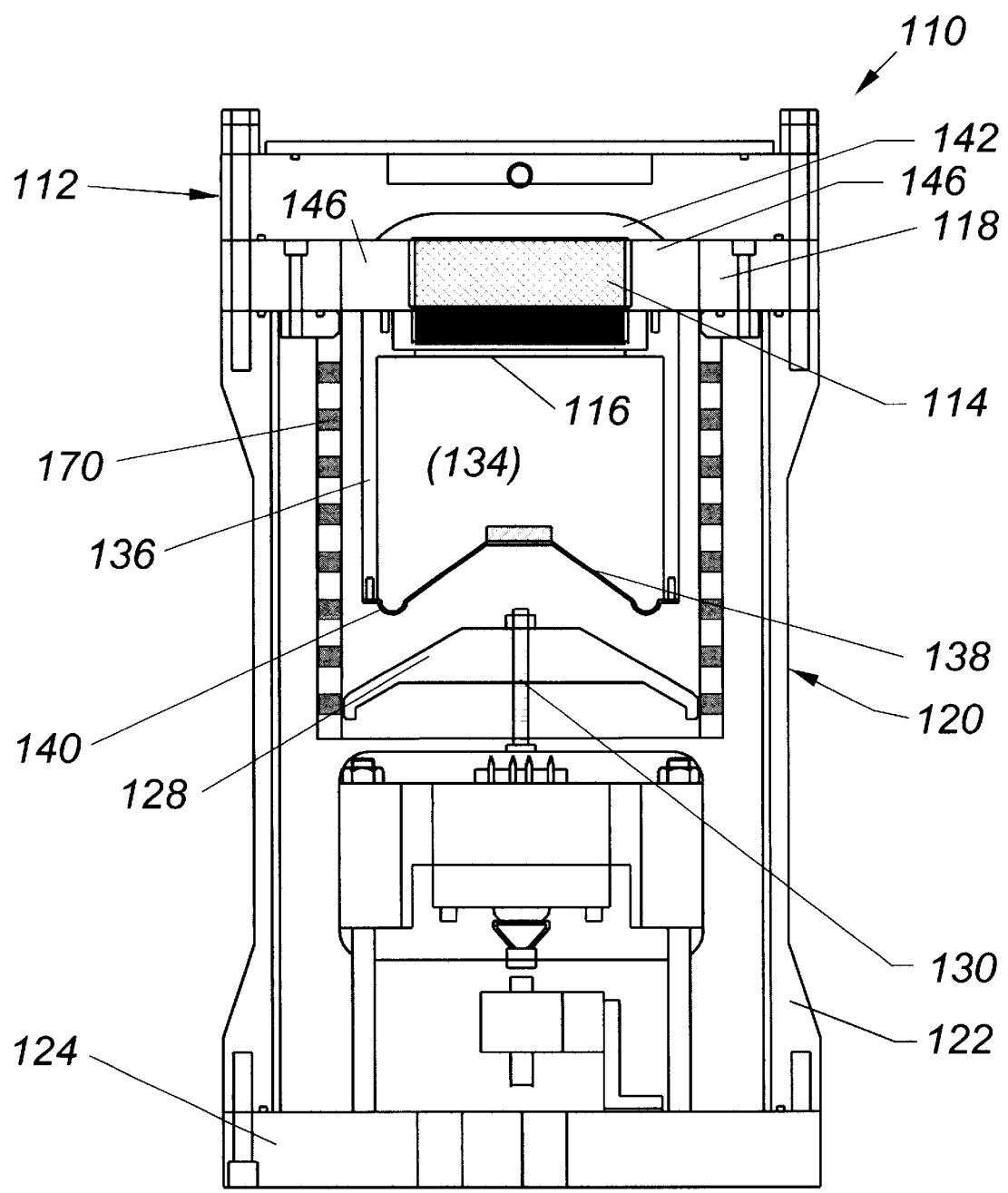
FIG. 7 is a cross-sectional view of another thermoacoustic device utilizing a spring with integral dynamic gas seal according to the present invention.

FIG. 7 illustrates an alternative thermoacoustic device, which is described in more detail in the previously incorporated provisional and previously incorporated patent application entitled "Thermoacoustic Device." The components of the thermoacoustic device 110 are preferably housed in a pressure vessel 120. The pressure vessel 120 is formed by a generally cylindrical wall or shell 122 that is closed on its "lower" end by a base plate 124. The upper end of the wall or shell 122 is closed off by the combination of a platform or support 118 and a cold head heat exchanger 112.

A linear motor is attached to the bottom plate 124 and the moving portion of the linear motor is connected to the main piston or power piston 128 by a connecting member 130. A spring with an integral dynamic gas seal 170 extends between the power piston 128 and the support 118. This defines part of a compliant enclosure, in accordance with the disclosure in U.S. provisional patent application Serial No. 60/372,008, and a co-pending patent application entitled "Compliant Enclosure for Thermoacoustic Devices," filed Apr. 9, 2003. Additional discussion and benefits of this compliant enclosure are provided in these applications. As the power piston 128 moves upwardly, the working fluid in the compliant enclosure is compressed, and as the power piston 128 moves downwardly, the working fluid in the compliant enclosure is decompressed.

A multiplier volume 134 is defined inside the compliant enclosure. This multiplier volume 134 is defined by a multiplier cylinder 136 which has an upper end attached to the support 118 and a lower end closed off by a multiplier cone or piston 138. A flexible seal 140 interconnects the cone or piston 138 with the cylinder 136. As the multiplier cone 138 moves upwardly and downwardly, the volume of the multiplier volume, and the pressure of the gas contained therein, is increased and decreased.

The volume of working fluid inside the compliant enclosure and outside the multiplier volume 134 may be referred to as the main volume 144. The main volume 144 and the multiplier volume 134 are in fluid communication through the thermal components (heat exchanger 112 and 116 and regenerator 114). That is, a fluid path is defined from the multiplier volume 134, through the hot heat exchanger 116, through the regenerator 114, through the fins 142 of the cold heat exchanger 112, and through windows 146 in the support 118. Therefore, gas can flow from the main volume 144 through the windows 146, make a U-turn through the fins 142, and enter the regenerator 114. In operation, the multiplier piston 138 and power piston 128 move generally in phase or close to being in phase with one another.

While the invention has been particularly shown and described with reference to preferred embodiments thereof, it will be understood by those skilled in the art that various alterations in form and detail may be made therein without departing from the spirit and scope of the invention.

I claim:

1. A spring with an integral dynamic gas seal comprising:
a spring having a pair of spaced apart ends and a spring body extending therebetween;
the spring body comprising a perimeter wall formed of a first material and extending in a longitudinal direction, the wall having a plurality of openings defined therein, the openings being provided in a plurality of transverse tiers, each tier including a plurality of separate openings each extending along a portion of the perimeter, the openings in each tier being spaced apart so as to define a post between each adjacent opening such that each tier includes a plurality of posts, the openings in each tier being staggered with respect to the openings in adjacent tiers such that each of the openings of each tier overlie one of the posts in an adjacent tier; and
a closure member covering each of the openings such that the spring body is sealed, the closure members comprising a body of elastomeric material filling each of the openings, the elastomeric material having a different degree of flexibility than the first material.

2. The spring with integral dynamic gas seal according to claim 1, wherein the closure members further comprise a layer of elastomeric material disposed adjacent each of the openings.

3. The spring with integral dynamic gas seal according to claim 1, wherein the perimeter wall is generally cylindrical.

4. The spring with integral dynamic gas seal according to claim 1, wherein the first material is steel.

5. The spring with integral dynamic gas seal according to claim 1, wherein the openings are defined through the perimeter wall.

6. The spring with integral dynamic gas seal according to claim 1, wherein the posts of each tier are evenly spaced about the perimeter wall.

7. A thermoacoustic device comprising:
a housing;
a thermal core disposed in the housing, the thermal core including at least a first and a second heat exchanger;
a piston spaced from the thermal core, the piston being operable to oscillate with respect to the thermal core;
a spring with an integral dynamic gas seal, the spring having a pair of ends and a spring body extending therebetween, one of the ends being sealed to the piston and the other end being in fluid communication with the thermal core, the spring body including a perimeter wall formed of a first material and extending in a longitudinal direction, the wall having a plurality of openings defined therein, the openings being provided in a plurality of adjacent tiers, each tier including a plurality of separate openings each extending along a portion of the perimeter, the openings in each tier being spaced apart so as to define a post between each adjacent opening such that each tier includes a plurality of posts, the openings in each tier being staggered with respect to the openings in adjacent tiers such that each of the openings of each tier overlie one of the posts in an adjacent tier, the spring with integral gas seal further including a closure member covering each of the openings such that the perimeter wall of the spring body is sealed, the closure member being formed of a second material having a different degree of flexibility than the first material.

8. The thermoacoustic device according to claim 7, wherein the closure members comprise a body of elastomeric material filling each of the openings.

9. The thermoacoustic device according to claim 7, wherein the closure members comprise a layer of elastomeric material disposed adjacent each of the openings.

10. The thermoacoustic device according to claim 7, wherein the closure members are integrally formed as a continuous layer of elastomeric material disposed adjacent the wall so as to cover all of the openings.

11. The thermoacoustic device according to claim 7, wherein the perimeter wall is generally cylindrical.

12. The thermoacoustic device according to claim 7, wherein the first material is steel and the second material is an elastomeric material.

13. A thermoacoustic device comprising:
a housing;
a thermal core disposed in the housing, the thermal core including at least a first and a second heat exchanger;
a piston spaced from the thermal core, the piston being operable to oscillate with respect to the thermal core;
a spring having a pair of ends and a spring body extending therebetween, one of the ends connected to the piston and the other end being supported by the housing, the spring body including a perimeter wall extending in a longitudinal direction, the wall having a plurality of openings defined therein, the openings being provided in a plurality of adjacent tiers, each tier including a plurality of separate openings each extending along a portion of the perimeter, the openings in each tier being spaced apart so as to define a post between each adjacent opening such that each tier includes a plurality of posts, the openings in each tier being staggered with respect to the openings in adjacent tiers such that each of the openings of each tier overlie one of the posts in an adjacent tier; and
a flexure seal having a pair of ends and a flexure body extending therebetween, one of the ends being sealed to the piston and the other end being in fluid communication with the thermal core.

* * * * *

UNITED STATES PATENT AND TRADEMARK OFFICE
CERTIFICATE OF CORRECTION

PATENT NO. : 6,755,027 B2
DATED : June 29, 2004
INVENTOR(S) : Steven L. Garrett

It is certified that error appears in the above-identified patent and that said Letters Patent is hereby corrected as shown below:

Column 3,
Line 18, after "expansion" insert -- of --.
Line 27, replace "though" with -- through --.

Column 7,
Line 2, replace "elasomer's" with -- elastomer's --.

Column 8,
Line 2, replace "need" with -- needs --.

Column 9,
Line 23, replace "end" with -- ends --.
Line 57, replace "if" with -- is --.

Column 11,
Line 17, replace "the" with -- that --.

Signed and Sealed this

Eleventh Day of October, 2005

JON W. DUDAS
*Director of the United States Patent and Trademark Office*